US012759442B2

(12) United States Patent
Yasuda et al.

(10) Patent No.: US 12,759,442 B2
(45) Date of Patent: Oct. 13, 2026

(54) DRIVER'S SEAT HEATER AND AUTOMOBILE DRIVER'S SEAT

(71) Applicants: NHK SPRING CO., LTD., Yokohama (JP); SUBARU CORPORATION, Tokyo (JP)

(72) Inventors: Kenzo Yasuda, Yokohama (JP); Daisuke Tanaka, Yokohama (JP); Yosuke Ishiyama, Tokyo (JP); Fumito Kitanaka, Tokyo (JP); Masato Fukushima, Tokyo (JP)

(73) Assignees: NHK SPRING CO., LTD., Yokohama (JP); SUBARU CORPORATION, Tokyo (JP)

( * ) Notice: Subject to any disclaimer, the term of this patent is extended or adjusted under 35 U.S.C. 154(b) by 128 days.

(21) Appl. No.: 18/756,362

(22) Filed: Jun. 27, 2024

(65) Prior Publication Data

US 2025/0010771 A1 Jan. 9, 2025

(30) Foreign Application Priority Data

Jul. 7, 2023 (JP) ................................ 2023-112617

(51) Int. Cl.

*B60N 2/56* (2006.01)
*B60N 2/62* (2006.01)
*A47C 7/72* (2006.01)
*A47C 7/74* (2006.01)

(52) U.S. Cl.

CPC ............ *B60N 2/5678* (2013.01); *B60N 2/62* (2013.01); *A47C 7/72* (2013.01); *A47C 7/746* (2013.01); *B60N 2/5685* (2013.01)

(58) Field of Classification Search

CPC ...... B60N 2/5678; B60N 2/56; B60N 2/5685; A47C 7/72; A47C 7/74; A47C 7/746; A47C 7/748

See application file for complete search history.

(56) References Cited

U.S. PATENT DOCUMENTS

| | | | | |
|---|---|---|---|---|
| 9,744,890 | B2 * | 8/2017 | Nii ...................... | B60N 2/5642 |
| 10,259,360 | B2 * | 4/2019 | Sato .................... | B60N 2/5678 |
| 2021/0031657 | A1 | 2/2021 | Sato et al. | |
| 2022/0332229 | A1 | 10/2022 | Sato et al. | |
| 2023/0365041 | A1 | 11/2023 | Yamauchi | |

FOREIGN PATENT DOCUMENTS

| | | |
|---|---|---|
| JP | 2016-199166 | 12/2016 |
| JP | 2021-185084 | 12/2021 |
| JP | 2022-056310 | 4/2022 |

* cited by examiner

*Primary Examiner* — Syed A Islam
(74) *Attorney, Agent, or Firm* — Knobbe, Martens, Olson & Bear, LLP

(57) ABSTRACT

A driver's seat heater installed at a seat cushion of an automobile driver's seat that includes a main section for supporting buttocks and thighs of an occupant, and left and right side bolster sections that are provided at seat left-right direction both sides of the main section and that jut out in a seat upward direction further than the main section. The driver's seat heater includes a main heater installed at the main section, and a side heater installed only at the side bolster section on a right side, of the left and right side bolster sections.

4 Claims, 3 Drawing Sheets

DRIVER'S SEAT HEATER AND AUTOMOBILE DRIVER'S SEAT

CROSS-REFERENCE TO RELATED APPLICATION

This application is based on and claims priority under 35 USC 119 from Japanese Patent Application No. 2023-112617 filed on Jul. 7, 2023, the disclosure of which is incorporated by reference herein.

BACKGROUND

Technical Field

The present disclosure relates to a driver's seat for an automobile, and in particular to a driver's seat heater installed at a seat cushion of a driver's seat.

Related Art

A planar shaped heat generation body (seat heater) installed at a seat cushion of a vehicle seat is disclosed in Japanese Patent Application Laid-Open (JP-A) No. 2021-185084. The seat cushion includes a seating face section (main section) disposed at a center in a left-right direction, and left and right jutting out sections (left and right side bolster sections) that are disposed at the left and right outside the seating face section and that support side portions of an occupant. The seat heater includes a first heater installed at the main section, and left and right second heaters that are installed at the left and right side bolster sections.

SUMMARY

In the related art described above, the seat heater is installed at the main section of the seat cushion and to the left and right side bolster sections thereof, and so this results in a long wiring length of the seat heater, and increases the power consumption thereof. There is accordingly room for improvement from the perspective of fuel saving (power saving in an electric car).

In consideration of the above circumstances, an object of the present disclosure is to obtain a driver's seat heater and an automobile driver's seat that are capable of both securing occupant comfort and also achieving power saving.

A driver's seat heater of a first aspect of the present disclosure is a driver's seat heater installed at a seat cushion of an automobile driver's seat that includes a main section for supporting buttocks and thighs of an occupant, and left and right side bolster sections that are provided at seat left-right direction both sides of the main section and that jut out in a seat upward direction further than the main section. The driver's seat heater includes a main heater installed at the main section, and a side heater installed only at the side bolster section on a right side, of the left and right side bolster sections.

The driver's seat heater of the first aspect is installed at the seat cushion of an automobile driver's seat. The seat cushion includes the main section for supporting buttocks and thighs of an occupant, and the left and right side bolster sections that are provided at the seat left-right direction both sides of the main section and that jut out in the seat upward direction further than the main section. The driver's seat heater that is installed at the seat cushion includes the main heater installed at the main section, and the side heater installed only at the side bolster section on the right side, of the left and right side bolster sections. This enables good warming to be performed by the side heater on the thigh of the right leg of the occupant seated in the automobile driver's seat who tends to have a larger opening angle for the right leg operating the accelerator pedal than the opening angle for the left leg, enabling comfort of the occupant to be secured. Moreover a side heater is not installed at the left-side side bolster section, enabling a power saving to be achieved.

A driver's seat heater of a second aspect is the first aspect, wherein the main heater and the side heater are configured by separate heater wires, and the side heater is switched OFF when self-driving is enabled in an automobile installed with the automobile driver's seat and the automobile is traveling in a self-driving mode.

In the driver's seat heater of the second aspect, the side heater configured by the separate heater wire to the main heater is switched OFF when the automobile is traveling in the self-driving mode, namely when there is no need for the occupant seated in the automobile driver's seat to operate the acceleration pedal with their right leg. This thereby enables a further power saving to be achieved.

A driver's seat heater of a third aspect is the first aspect or the second aspect, wherein the main heater includes a left-side heater installed at a left-side portion of the main section, and a right-side heater installed at a right-side portion of the main section, and the right-side heater is disposed further toward an outer side in a seat left-right direction than the left-side heater.

In the driver's seat heater of the third aspect, the right-side heater installed at the right side portion of the main section of the seat cushion is disposed further toward the outer side in the left-right direction than the left-side heater installed at the seat left-side portion of the main section. This enables good warming to be performed by the right side heater on the thigh of the right leg of the occupant seated in the automobile driver's seat, which tends to have a larger opening angle than for the left leg.

An automobile driver's seat of a fourth aspect includes a cushion pad configuring a cushion member of a seat cushion, a cushion cover covering the cushion pad, and the driver's seat heater of any one of the first aspect to the third aspect installed between the cushion pad and the cushion cover.

In the automobile driver's seat of the fourth aspect, the driver's seat heater is installed between the cushion pad configuring the cushion member of the seat cushion and the cushion cover that covers the cushion pad. The driver's seat heater is the driver's seat heater of any one of the first aspect to the third aspect, and so the advantageous effects described above are obtained.

As described above, the driver's seat heater and the automobile driver's seat according to the present disclosure enable both comfort of an occupant to be secured, and also power saving to be achieved.

BRIEF DESCRIPTION OF THE DRAWINGS

Exemplary embodiments of the present invention will be described in detail based on the following figures, wherein.

DETAILED DESCRIPTION

Figure 1:
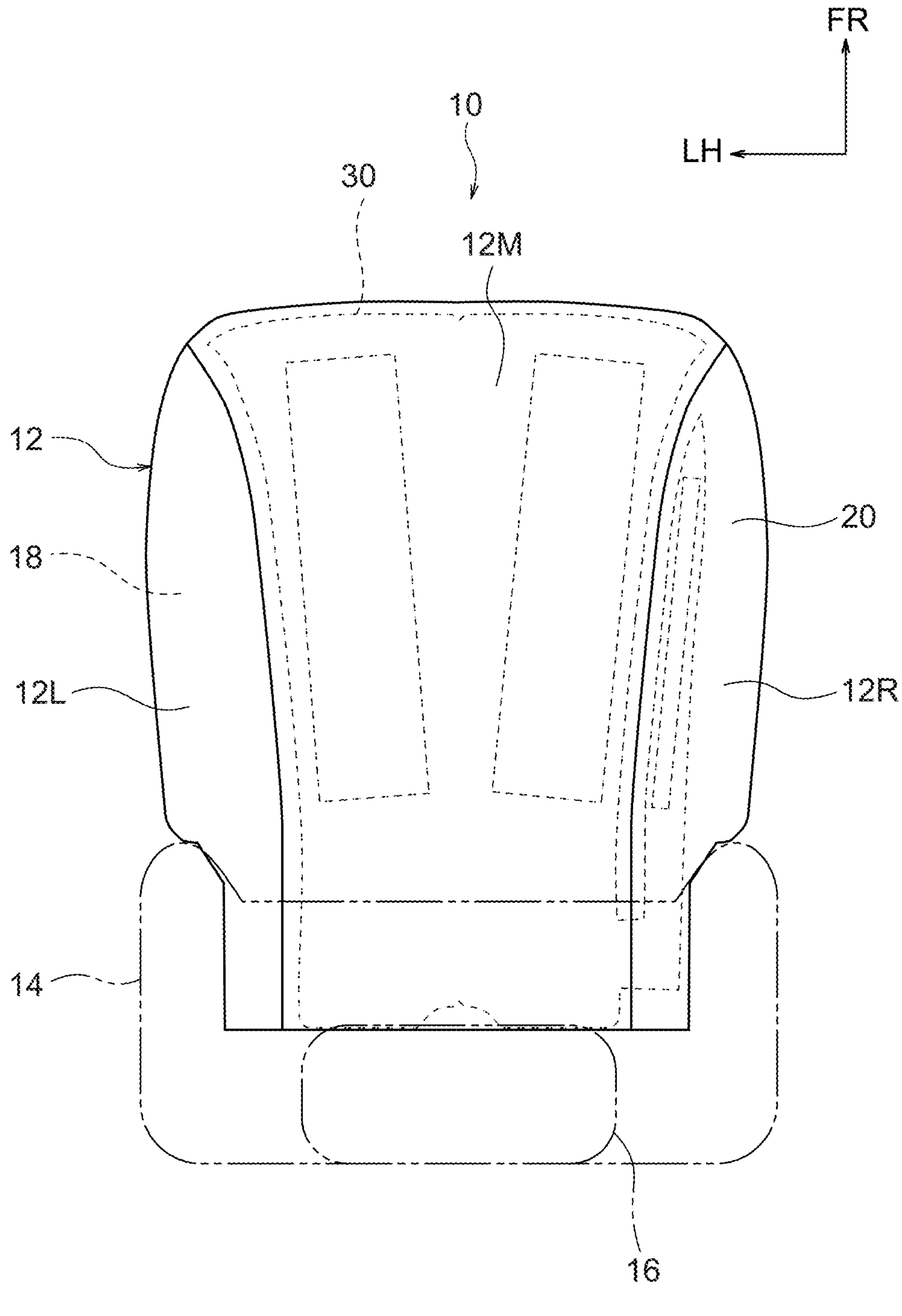
FIG. 1 is a plan view illustrating an automobile driver's seat according to an exemplary embodiment.
Figure 2:
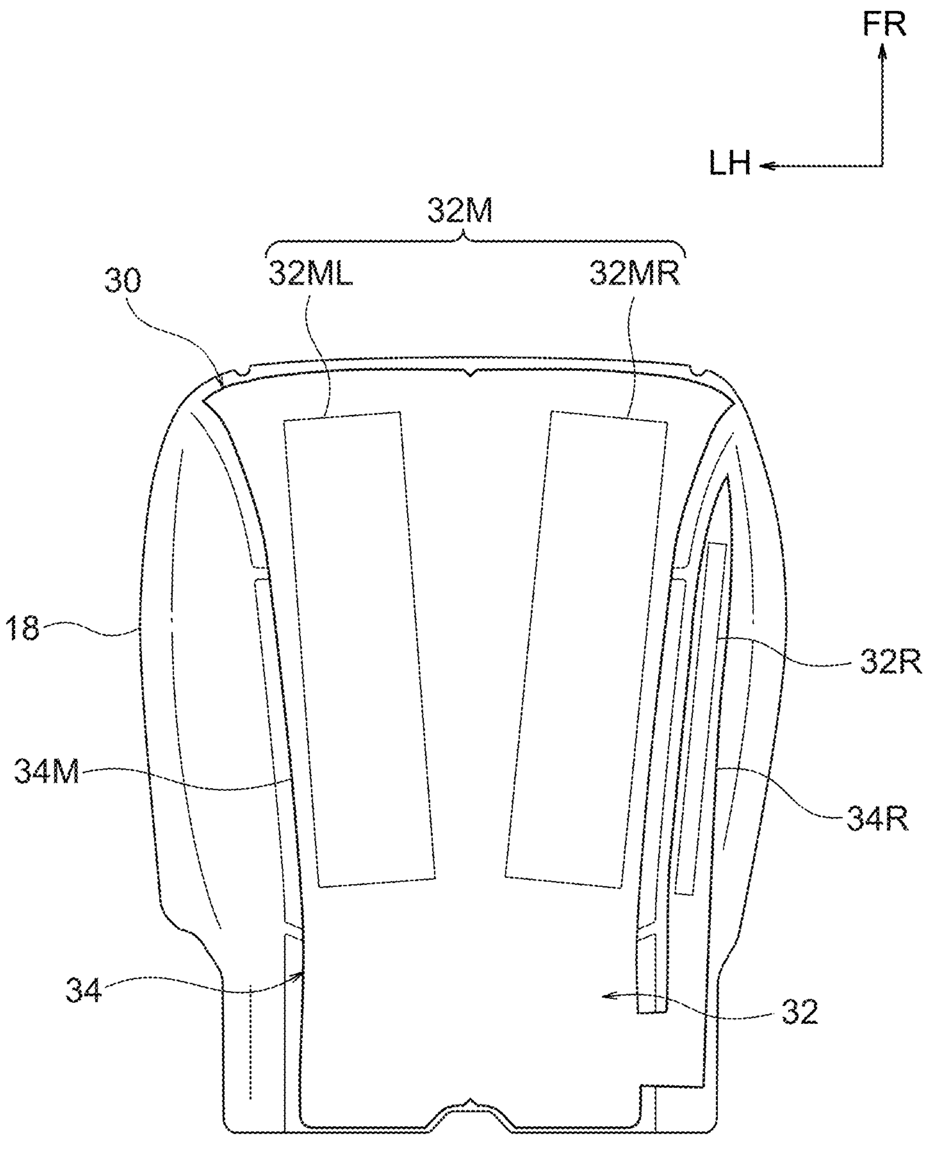
FIG. 2 is a plan view illustrating a seat cushion of an automobile driver's seat according to an exemplary embodiment, illustrated in a state in which a cushion cover has been omitted from illustration.
Figure 3:
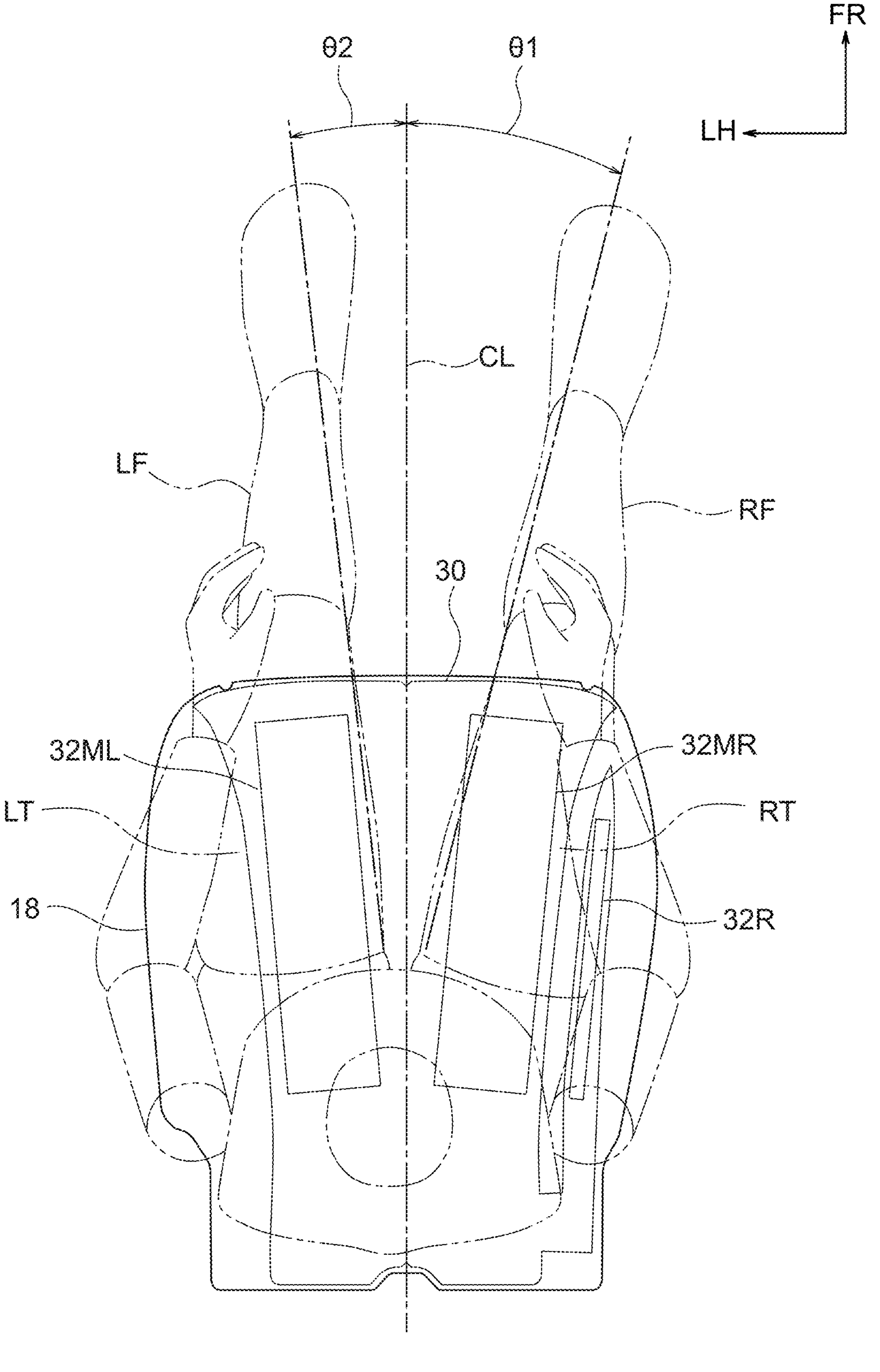
FIG. 3 is a plan view corresponding to FIG. 2 to explain leg opening angles of an occupant.

Description follows regarding an automobile driver's seat 10 according to a first exemplary embodiment of the present disclosure, with reference to FIG. 1 to FIG. 3. Note that some of the reference numerals are sometimes omitted in the drawings in order to facilitate viewing of the drawings. Moreover as appropriate in the drawings, arrows FR and LH respectively indicate a forward direction and a leftward direction of an automobile driver's seat. When reference is simply made to front and rear, left and right, and up and down directions, then these indicate directions with respect to the automobile driver's seat 10.

As illustrated in FIG. 1, the automobile driver's seat 10 according to the present exemplary embodiment includes a seat cushion 12 for an occupant of an automobile to sit on, a seatback 14 that supports the back of the occupant, and a headrest 16 that supports the head of the occupant. The automobile described above includes, for example, a level 2 or a level 3 self-driving function, and is able to be switched between a self-driving mode and a manual-driving mode.

The seat cushion 12 includes a non-illustrated cushion frame that is a frame, a cushion pad 18 that is a cushion member supported by the cushion frame, a cushion cover 20 that is a covering material covering the cushion pad 18, and a driver's seat heater 30 that is installed between the cushion pad 18 and the cushion cover 20. The cushion frame is, for example, configured from metal. The cushion pad 18 is, for example, configured from a foam body, such as urethane foam or the like. The cushion cover 20 is, for example, configured by sewing together plural cover pieces that are made from cloth, leather, synthetic leather, or the like.

The seat cushion 12 includes a main section 12M that supports the buttocks and thighs of the occupant from below, and left and right side bolster sections 12L, 12R that are provided at the left-right direction two sides of the main section 12M so as to jut out in an upward direction further than the main section 12M. The main section 12M configures a left-right direction central section of the seat cushion 12, and the left and right side bolster sections 12L, 12R configure left-right direction side sections of the seat cushion 12.

As illustrated in FIG. 2, a driver's seat heater 30 includes a heater main body 32, and a sheet shaped base member 34 that supports the heater main body 32. The heater main body 32 is, for example, a heater wire (heating line) such as a nichrome wire or the like that has been bent in a wavy shape, and the heater main body 32 is schematically illustrated in FIG. 1 to FIG. 3. The base member 34 is, for example, a non-woven fabric. Note that the heater main body 32 may any shape capable of generating heat by passing electricity through, such as a line shape, sheet shape, or film shape. Moreover, the base member 34 is not limited to being a non-woven fabric, and may be a flexible sheet shape, or flexible film shape.

The heater main body 32 includes a main heater 32M installed at the main section 12M of the seat cushion 12, and a side heater 32R that is installed only at the side bolster section 12R on the right side, of the left and right side bolster sections 12L, 12R. The driver's seat heater 30 does not include a side heater installed in the left-side side bolster section 12L. Moreover, there is no heater other than the driver's seat heater 30 installed at the seat cushion 12.

The main heater 32M and the side heater 32R are configured from separate heater wires (separate bodies). The main heater 32M includes a left-side heater 32ML installed at a left-side portion of the main section 12M, and a right-side heater 32MR installed at a right-side portion of the main section 12M. The right-side heater 32MR is disposed slightly further toward an outer side in the left-right direction than the left-side heater 32ML.

The base member 34 includes a main base member 34M installed at the main section 12M of the seat cushion 12, and a side base member 34R installed at the right-side side bolster section 12R. The main heater 32M, namely the left-side heater 32ML and the right-side heater 32MR, is attached to the base member 34, and the side heater 32R is attached to the side base member 34R.

The two ends of each of the heater wires configuring the main heater 32M and the side heater 32R are, for example, installed at a rear end portion of the seat cushion 12, and are electrically connected to a non-illustrated temperature adjustment device. This temperature adjustment device is electrically connected to a non-illustrated control device installed in the automobile driver's seat 10, and to a non-illustrated temperature sensor installed at the seat cushion 12. On being input with a control signal from the control device, the temperature adjustment device controls power to the main heater 32M and the side heater 32R so as to achieve a specific temperature corresponding to the signal input from the control device. In the present exemplary embodiment, the temperature adjustment device is configured so as to pass power through the main heater 32M and the side heater 32R and to raise the temperature of the main heater 32M and the side heater 32R when the temperature acquired by the temperature sensor is at or below the temperature corresponding to the signal input from the control device, and is configured so as to stop passing power to the main heater 32M and the side heater 32R when the acquired temperature exceeds the temperature corresponding to the above signal.

The above control device is electrically connected to a self-driving control device that controls self-driving of the automobile, and is configured so as to stop normal power to the side heater 32R by the temperature adjustment device (namely to make the side heater 32R always OFF) when the automobile is traveling in a self driving mode. This control device permits power to the side heater 32R by the temperature adjustment device when the automobile is traveling in manual-driving mode. A configuration is thereby adopted such that the side heater 32R is switched ON according to a detection result of the temperature sensor.

Next, description follows regarding the operation and advantageous effects of the present exemplary embodiment.

In the automobile driver's seat 10 configured as described above, the driver's seat heater 30 is installed at the seat cushion 12. The seat cushion 12 includes the main section 12M that supports the buttocks and thighs of the occupant from below, and includes the left and right side bolster sections 12L, 12R that are provided at the seat left-right direction two sides of the main section 12M so as to jut out upward further than the main section 12M. The driver's seat heater 30 includes the main heater 32M installed at the main section 12M, and the side heater 32R installed only at the right-side side bolster section 12R, of the left and right side bolster sections 12L, 12R.

As illustrated in FIG. 3, the occupant P seated on the automobile driver's seat 10 tends to have a leg opening angle θ1 of the right leg RF for operating the accelerator pedal that is larger than the leg opening angle θ2 of the left leg LF. This means that good warming of the thigh RT of the right leg RF can be performed by the side heater 32R that is installed at the right-side side bolster section 12R and that is expected to contact the thigh RT of the right leg RF, enabling the comfort of the occupant P to be secured. Moreover, no side heater is installed at the left-side side bolster section 12L that has little chance of contacting the thigh LT of the left leg LF for an occupant other than an occupant of large build, enabling the wiring line length of heater wires to be shortened, and enabling needless power consumption to be suppressed. This thereby enables greater power saving and lower cost to be achieved. Note that CL in FIG. 3 indicates a left-right direction center line of the seat cushion 12.

Moreover, in the driver's seat heater 30, the side heater 32R configured by a separate heater wire to the main heater 32M is switched OFF when the automobile is traveling in the self driving mode, namely when there is no need for the right leg RF of the occupant P seated in the automobile driver's seat 10 to operate the acceleration pedal. This thereby enables a further power saving to be achieved.

Moreover, in the driver's seat heater 30, the main heater 32M includes the left-side heater 32ML installed at a left-side portion of the main section 12M, and the right-side heater 32MR installed at a right-side portion of the main section 12M. The right-side heater 32MR is arranged further to the outside in the left-right direction than the left-side heater 32ML. This thereby enables good warming to be performed by the right-side heater 32MR on the thigh RT of the right leg RF of the occupant P seated in the automobile driver's seat 10, which tends to have a larger opening angle than the left leg LF.

Note that although in the above exemplary embodiment the right-side heater 32MR of the main heater 32M is configured disposed further to the outside in the left-right direction than the left-side heater 32ML, there is no limitation thereto, and the right-side heater 32MR and the left-side heater 32ML may be configured so as to be disposed with left-right symmetry.

Moreover, although in the above exemplary embodiment the main heater 32M and the side heater 32R are configured by separate heater wires, there is no limitation thereto, and the main heater 32M and the side heater 32R may be configured by a single heater wire.

In addition various modifications may be implemented within a range not departing from the spirit of the present disclosure. Moreover, obviously the scope of rights of the present disclosure is not limited by the above exemplary embodiment.

What is claimed is:

1. A driver's seat heater installed at a seat cushion of an automobile driver's seat, wherein the automobile driver's seat comprises a main section configured to support buttocks and thighs of an occupant, and left and right side bolster sections that are provided at seat left-right direction both sides of the main section and that jut out in a seat upward direction further than the main section, the driver's seat heater further comprising:

a heater main body comprising a main heater and a side beater; and a sheet shaped base member configured to support the heater main body, wherein the main heater is installed at the main section, wherein the side heater is installed only at the right-side bolster section positioned on a right side of the automobile driver's seat, wherein the automobile driver's seat does not comprise any heater at the left-side bolster section positioned on a left side of the automobile driver's seat.

2. The driver's seat heater of claim 1, wherein:

the main heater and the side heater are configured by separate heater wires; and the side heater is switched OFF when self-driving is enabled in an automobile installed with the automobile driver's seat and the automobile is traveling in a self-driving mode.

3. The driver's seat heater of claim 1, wherein:

the main heater comprises:

a left-side heater installed at a left-side portion of the main section; and a right-side heater installed at a right-side portion of the main section, wherein the right-side heater is disposed further toward an outer side in a seat left-right direction than the left-side heater.

4. An automobile driver's seat comprising:

a cushion pad configuring a cushion member of a seat cushion;

a cushion cover covering the cushion pad; and the driver's seat heater of claim 1 installed between the cushion pad and the cushion cover.

* * * * *